United States Patent
Pyle et al.

(10) Patent No.: US 6,397,892 B1
(45) Date of Patent: Jun. 4, 2002

(54) MULTI-STAGE UNLOADER

(75) Inventors: Carl A. Pyle, Clifton, KS (US); Kenneth N. Young, Amarillo, TX (US)

(73) Assignee: Enron Machine & Mechnical Services, Inc., Omaha, NE (US)

( * ) Notice: Subject to any disclaimer, the term of this patent is extended or adjusted under 35 U.S.C. 154(b) by 0 days.

(21) Appl. No.: 09/650,325

(22) Filed: Aug. 29, 2000

(51) Int. Cl.[7] .......................... F16K 11/22; F16K 37/00
(52) U.S. Cl. ...................... 137/637.2; 92/5 R; 92/151; 137/556; 137/625.5; 251/63.5
(58) Field of Search ............... 137/556, 655.5; 251/62, 63, 63.5, 63.6; 92/5 R, 151, 152

(56) References Cited

U.S. PATENT DOCUMENTS

| | | | | |
|---|---|---|---|---|
| 3,028,878 A | * | 4/1962 | Natho | 137/556 |
| 3,415,275 A | * | 12/1968 | Berggren | 137/556 |
| 3,895,651 A | * | 7/1975 | Okada et al. | 137/637.2 |
| 4,423,748 A | * | 1/1984 | Ellett | 137/556 |
| 4,530,377 A | * | 7/1985 | Peters | 137/637.2 |
| 4,585,207 A | * | 4/1986 | Shelton | 251/63.6 |
| 4,934,652 A | * | 6/1990 | Golden | 251/63.6 |
| 5,232,023 A | * | 8/1993 | Zimmerly | 137/637.2 |
| 5,469,880 A | * | 11/1995 | Zimmerly | 137/637.2 |
| 5,826,613 A | * | 10/1998 | Schalk | 251/63.5 |
| 5,924,672 A | * | 7/1999 | Crochet et al. | 251/63.6 |
| 6,244,563 B1 | * | 6/2001 | Ejiri | 251/63.6 |

FOREIGN PATENT DOCUMENTS

DE 1163622 * 2/1964 ............. 137/637.2

* cited by examiner

*Primary Examiner*—George L. Walton
(74) *Attorney, Agent, or Firm*—Mark Frederiksen

(57) ABSTRACT

An unloader includes a first volume bottle with a cavity formed therein of predetermined volume, and a port in the forward end with a plug operably mounted to selectively open and close the port. A second volume bottle is stacked on the first volume bottle and has a port in the forward end with a plug operable to open and close the second bottle port. The second bottle is arranged such that the second port will fluidly connect the first and second bottles. Actuators are connected to the plugs in the first and second bottles to selectively open only the first bottle or both bottles together, to thereby provide a two stage internal clearance for the reciprocating compressor cylinder.

5 Claims, 7 Drawing Sheets

US 6,397,892 B1

MULTI-STAGE UNLOADER

CROSS-REFERENCES TO RELATED APPLICATIONS (Not applicable).

STATEMENT AS TO RIGHTS TO INVENTIONS MADE UNDER FEDERALLY SPONSORED RESEARCH AND DEVELOPMENT (Not applicable).

BACKGROUND OF THE INVENTION (1) Field of the Invention

The present invention relates generally to a reciprocating compressor utilized to pump fluids, and more particularly to an improved unloader for varying the internal volume of a reciprocating compressor cylinder.

(2) Background Information

Natural gas is distributed through pipelines throughout the country. A series of pumping stations are located at predetermined intervals along the pipelines to move the gas throughout the system. Each pumping station includes one or more compressors with a plurality of reciprocating cylinders for moving the gas through the pipeline.

An unloader is a device which will selectively increase or decrease internal volume/clearance of a reciprocating compressor cylinder in order to increase or decrease the unit load and accommodate changing suction and discharge pressures. It is beneficial to maintain a compressor engine loaded near its rated horsepower to obtain the lowest specific fuel consumption rate and the highest compressor throughout. This is accomplished by constantly varying the unit load depending upon various operating conditions. Such conditions include: (1) the type/quality of gas being compressed; (2) operating pressures and temperatures; (3) compressor speed; (4) compressor cylinder size (diameter of the bore and length of the stroke); and (5) fixed and variable clearance volumes.

Single stage unloaders are currently used to permit the clearance volumes in the compressor cylinders to be varied, to thereby attempt to keep the engine loaded near its rated horsepower. However, single state unloaders still suffer several drawbacks.

First, there are a limited number of locations around a compressor cylinder for installation of an unloader. Thus, the amount of clearance volume available to a cylinder is also limited.

In addition, if the single stage unloader provides a large volume change, the large volume change may lead to cylinder single acting operation where gas is compressed and expanded without the gas flowing through the cylinder. This operation leads to high temperatures that may exceed material limits.

BRIEF SUMMARY OF THE INVENTION

It is therefore a general object of the present invention to provide an improved multistage unloader for reciprocating compressor cylinders.

Another object of the present invention is to provide improved unloader operation, with multiple volumes in place of a single volume, which permits the selection of smaller clearance volumes, allowing a compressor to maintain high volumes while keeping the engine loaded near its rated horsepower.

A further object is to provide an improved multi-stage unloader which permits a greater selection of internal clearances in the same space as a single stage unloader.

These and other objects of the present invention will be apparent to those skilled in the art.

The unloader of the present invention includes a first volume bottle with a cavity formed therein of predetermined volume, and a port in the forward end with a plug operably mounted to selectively open and close the port. A second volume bottle is stacked on the first volume bottle and has a port in its forward end with a movable plug to open and close the second bottle port. The second bottle is arranged such that the second port is connected to the gas stream of the first and second bottles. Actuators are connected to the plugs in the first and second bottles to selectively open only the first bottle or both bottles together, to thereby provide a two stage internal clearance for the reciprocating compressor cylinder.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which.

DETAILED DESCRIPTION OF THE INVENTION

Figure 1:
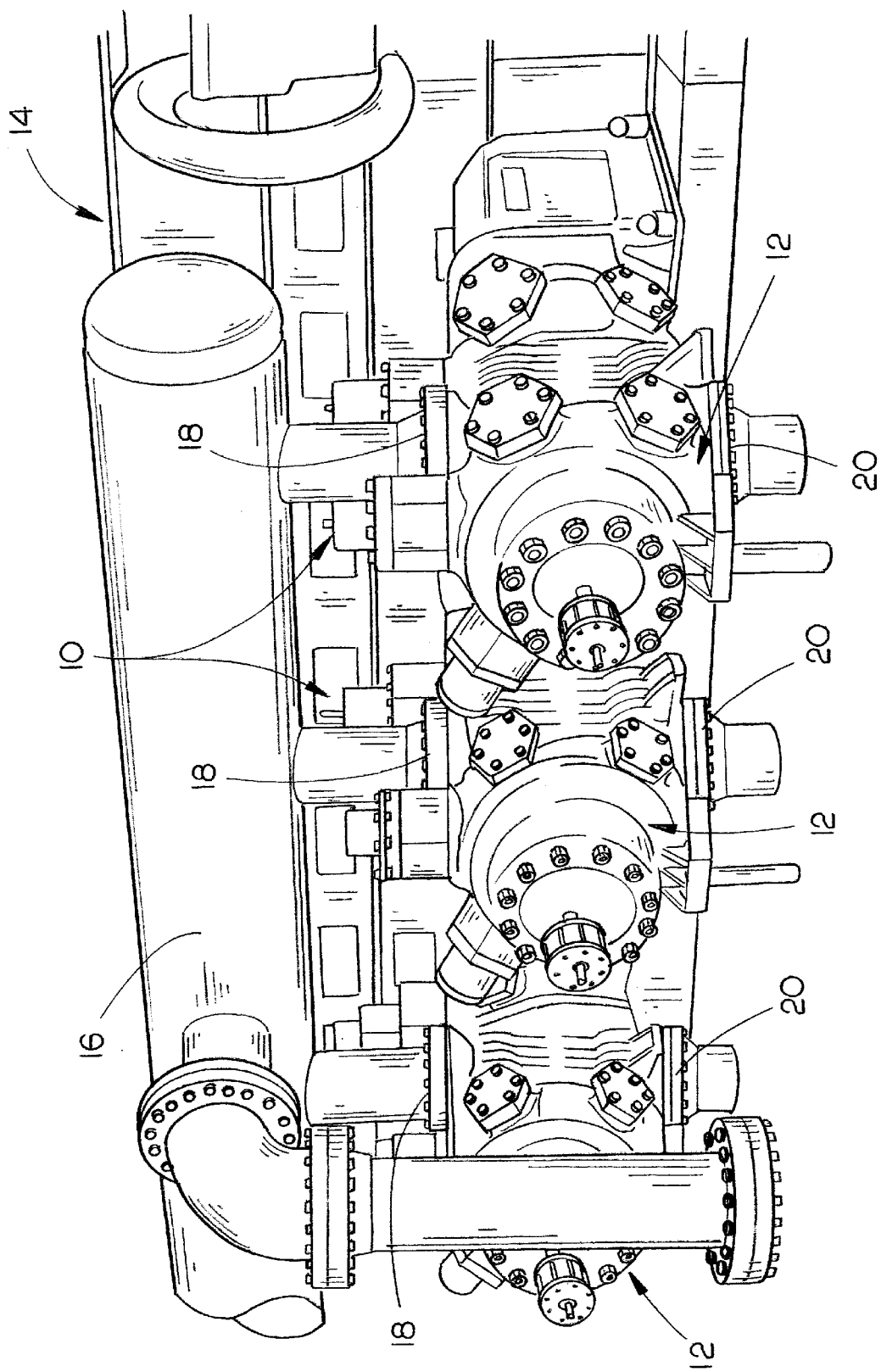
FIG. 1 is a perspective view of a compressor for pumping natural gas in a pumping station.

Referring now to the drawings, and more particularly to FIG. 1, a plurality of two stage unloaders are designated generally at 10, and are shown mounted on a plurality of cylinders 12 of a compressor 14. Natural gas is supplied to each cylinder 12 through supply pipe 16 to an intake port 18 on each cylinder 12. Intake ports 18 are located on the upper, suction side of each cylinder 12. Discharge ports 20 are provided on the lower discharge side of each cylinder 12, and lead to a discharge pipe (not shown) for further distribution through the distribution network.

Figure 2:
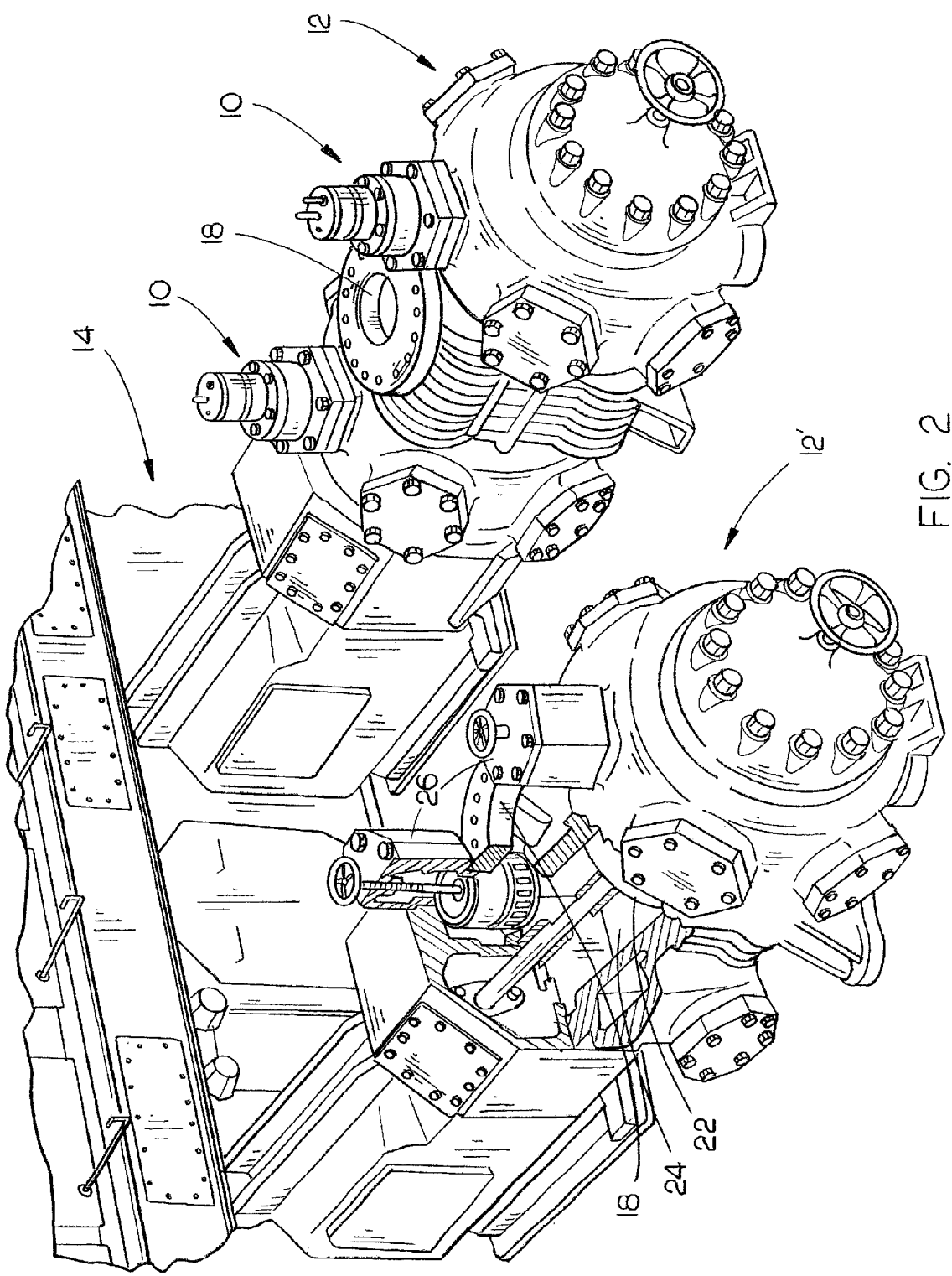
FIG. 2 is a perspective view of two reciprocating compressor cylinders of the compressor of FIG. 1, with one cylinder and prior art manually operated single stage unloader shown in partial sectional view.

Referring now to FIG. 2, two cylinders 12 of compressor 14 are shown in more detail. Each cylinder 12 is provided with a reciprocating piston 22 which reciprocates between proximal and distal positions within a cylinder bore 24. A pair of prior art single stage unloaders 26 are shown on cylinder 12', located at the proximal and distal ends of bore 24, such that each stroke of piston 22 in each direction will move gas from the intake port 18 to the discharge port 20 (not shown). A pair of two stage unloaders 10 are mounted in similar locations at the proximal and distal ends of cylinder 12 in FIG. 2.

Figure 3A:
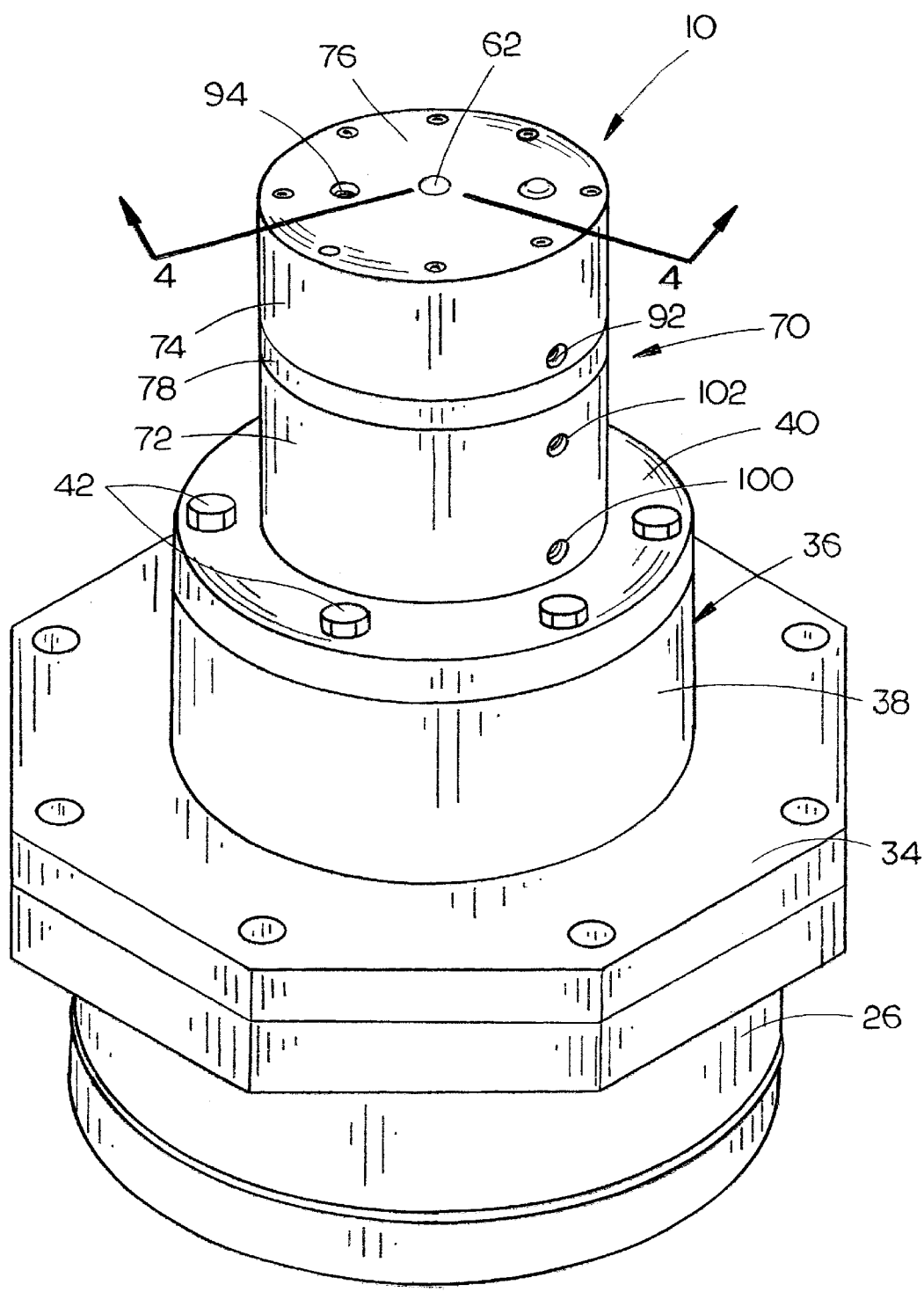
FIG. 3A is a perspective view of the two stage unloader of the present invention.
Figure 3B:
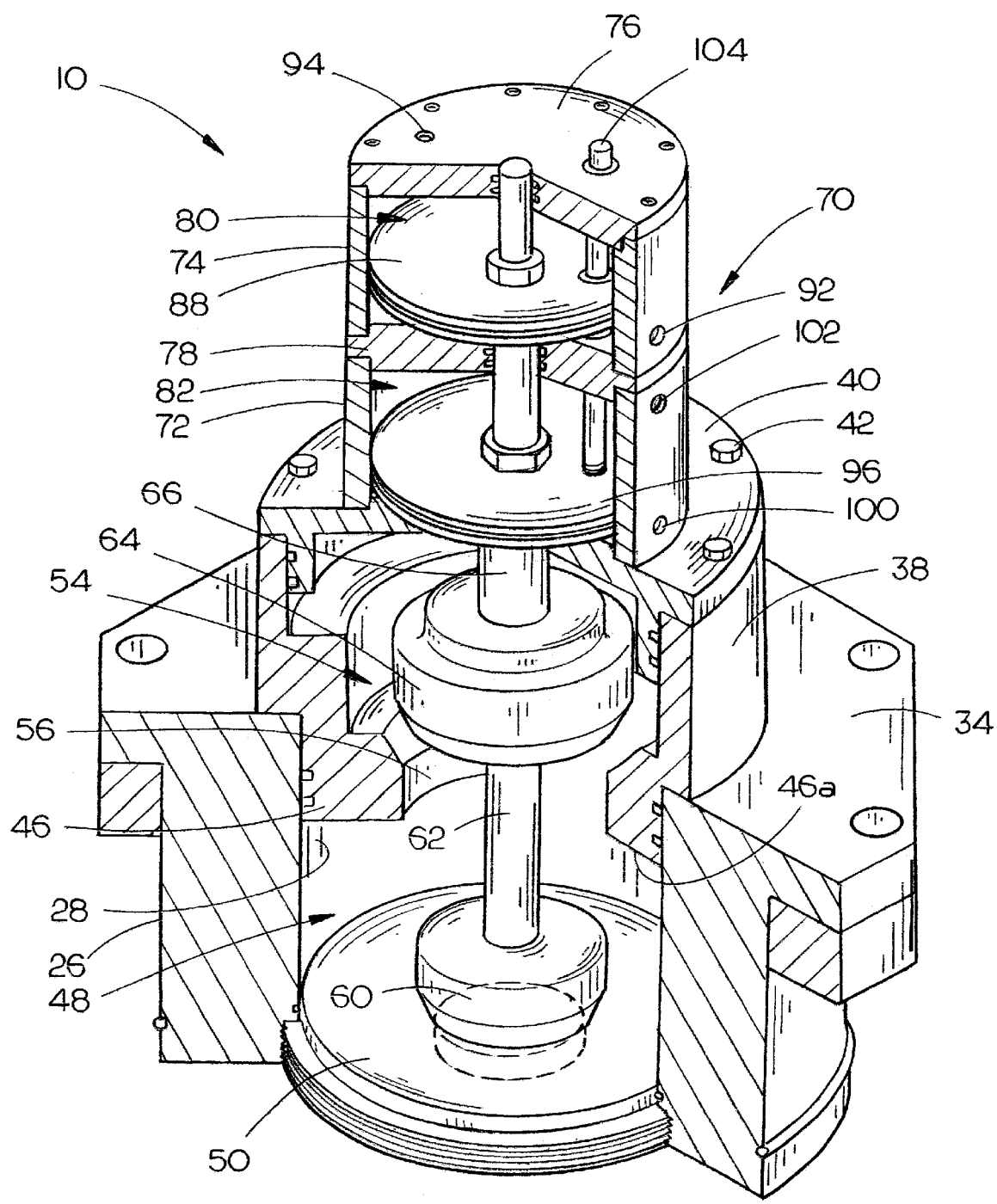
FIG. 3B is a perspective view similar to FIG. 3A, with portions shown in sectional view to show the interior of the two stage unloader.
Figure 4:
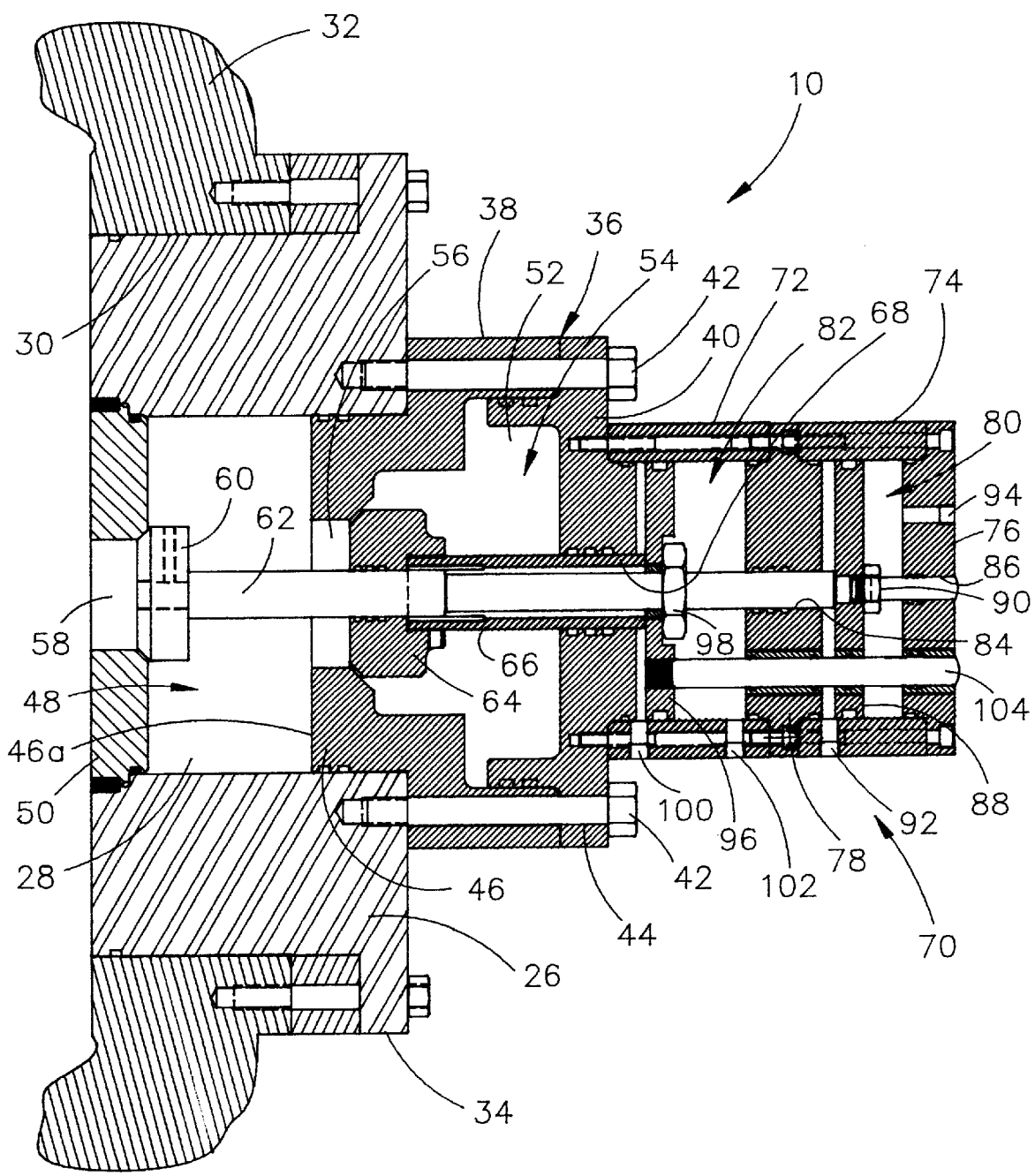
FIG. 4 is a vertical sectional view through the two stage unloader, taken at lines 4—4 in FIG. 3A, with the unloaders in a "closed" position.

Referring now to FIGS. 3A, 3B and 4, the two stage unloader 10 of the present invention includes a first stage volume bottle 26 having a bore 28 extending through the length thereof. Volume bottle 26 is cylindrical in shape, and has an outer diameter designed to slide within the existing opening 30 in the cylinder head 32, as shown in FIG. 4. A radially projecting flange 34 at the outward/distal end of first stage volume bottle 26 is bolted to the cylinder head 32 to secure the unloader 10 in position.

The second stage volume bottle is designated generally at 36, and includes a cylindrical transition piece 38 mounted to the distal end of first stage bottle 26, and an end cap 40 mounted to the distal end of second stage bottle transition piece 38. A plurality of bolts 42 extend through a plurality of apertures 44 around the perimeter of end cap 40 and thence through the side wall of transition piece 38 to secure second stage volume bottle 36 to first stage volume bottle 26. Transition piece 38 has a cylindrical forwardly projecting end 46 with an outer diameter sized to slide within bore 28 of first stage bottle 26. The forward face 46a of forward end 46 forms the rearward end of the first stage cavity, designated generally at 48, within bore 28. A disk-shaped plate 50 is mounted in the forward/inward end of bore 28 to form a forward wall for cavity 48.

Second stage volume bottle 36 includes a central bore 52 defining a second stage cavity designated generally at 54 within bore 52 extending between end cap 40 and the transition piece forward end forward face 46a. A port 56 is formed in the forward end forward face 46a to permit gas within first stage cavity 48 to enter second stage cavity 54. Similarly, a port 58 in plate 50 permits gas from the cylinder head 32 to enter first stage cavity 48.

A plug 60 is mounted on the forward end of and elongated actuator shaft 62, and is sized to be securely seated in the first stage port 58, to seal the same. Actuator shaft 62 extends through the second stage cavity 54 and thence through an aperture in end cap 40 to project rearwardly outwardly from end cap 40.

A second stage plug 64 has an aperture formed therethrough and is slidably mounted on actuator shaft 62. Second stage plug 64 is sized to be seated and seal second stage port 56. Second stage plug 64 is mounted on the forward end of an elongated sleeve 66 which extends through aperture 68 in end cap 40 to project rearwardly therefrom. Actuator shaft 62 is slidably journaled through sleeve 66, to permit slidable movement of actuator shaft 62 independently of movement of sleeve 66 within aperture 68.

An actuator assembly is designated generally at 70 and is operable to selectively shift actuator shaft 62 and sleeve 66 so as to open or close first stage port 58 with first stage plug 60 and/or second stage port 56 with second stage plug 64. Actuator assembly 70 includes a second stage cylinder 72 mounted on the outward face of end cap 40 and coaxial with actuator shaft 62, and a first stage cylinder 74 stacked coaxial atop second stage cylinder 72. A disk-shaped top 76 is mounted on the outward end of first stage cylinder 74, to enclose cylinders 72 and 74. A disk-shaped splitter plate 78 is juxtaposed in between top plate 76 and end cap 40 to separate the interior bore of actuator assembly 70 into a first stage cavity 80 within first stage cylinder 74, and a second stage cavity 82 within second stage cylinder 72.

Actuator shaft 62 extends through an aperture 84 in splitter plate 78, and thence through an aperture 86 in top plate 76 to permit the actuator shaft to project outwardly from top plate 76 when moved to an open position as described in more detail hereinbelow. A piston 88 is secured to actuator shaft 62 by a locknut 90, to slide within first stage cavity 80 and slides with actuator shaft 62. Piston 88 has a diameter to provide a sliding seal between the piston and the inner wall of first stage cylinder 74, and is positioned spaced slightly rearward of splitter plate 78, when first stage plug is in the closed position. A hole 92 through the side wall of first stage cylinder 74 and located between piston 88 and splitter plate 78, permits the entry of fluid under pressure to force piston 88 outwardly towards top plate 76, thereby shifting actuator shaft 62 rearwardly and outwardly, along with first stage plug 60, to thereby open first stage port 58. A hole 94 in top plate 76 permits entry of fluid under pressure to shift piston 88 forwardly, thereby shifting actuator shaft 62 and plug 60 back to the closed position shown in FIG. 4.

A second piston 96 is secured to the rearward projecting end of sleeve 66, by locknut 98 such that piston 96 will slide with sleeve 66 along the axis of actuator shaft 62. Piston 96 also has a diameter to provide a sliding seal between the piston and the inner wall of second stage cylinder 72, and is positioned spaced rearwardly of end cap 40 when second stage plug 64 and sleeve 66 are in the closed position shown in FIG. 4. A hole 100 through the side wall of second stage cylinder 72 and located between piston 96 and end cap 40, permits the entry of fluid therebetween to push piston 96 rearwardly until locknut 98 contacts splitter plate 78. A second hole 102 located between piston 96 and splitter plate 98 permits the entry of fluid under pressure to return a piston 96, sleeve 66, and plug 64 to the closed position shown in FIG. 4.

An indicator pin 104 is connected to second stage piston 96, and extends rearwardly therefrom, and is journaled through aligned apertures in splitter plate 78, first stage piston 88, and top plate 76, to project from top plate 76. In this way, when second stage piston 96 is shifted rearwardly to move second stage plug 64 and open second stage port 56, indicator pin 104 will be moved rearwardly and project outwardly from the rearward end of top plate 76. It is thereby possible to visually ascertain whether the second stage port is open or closed.

Figure 5:
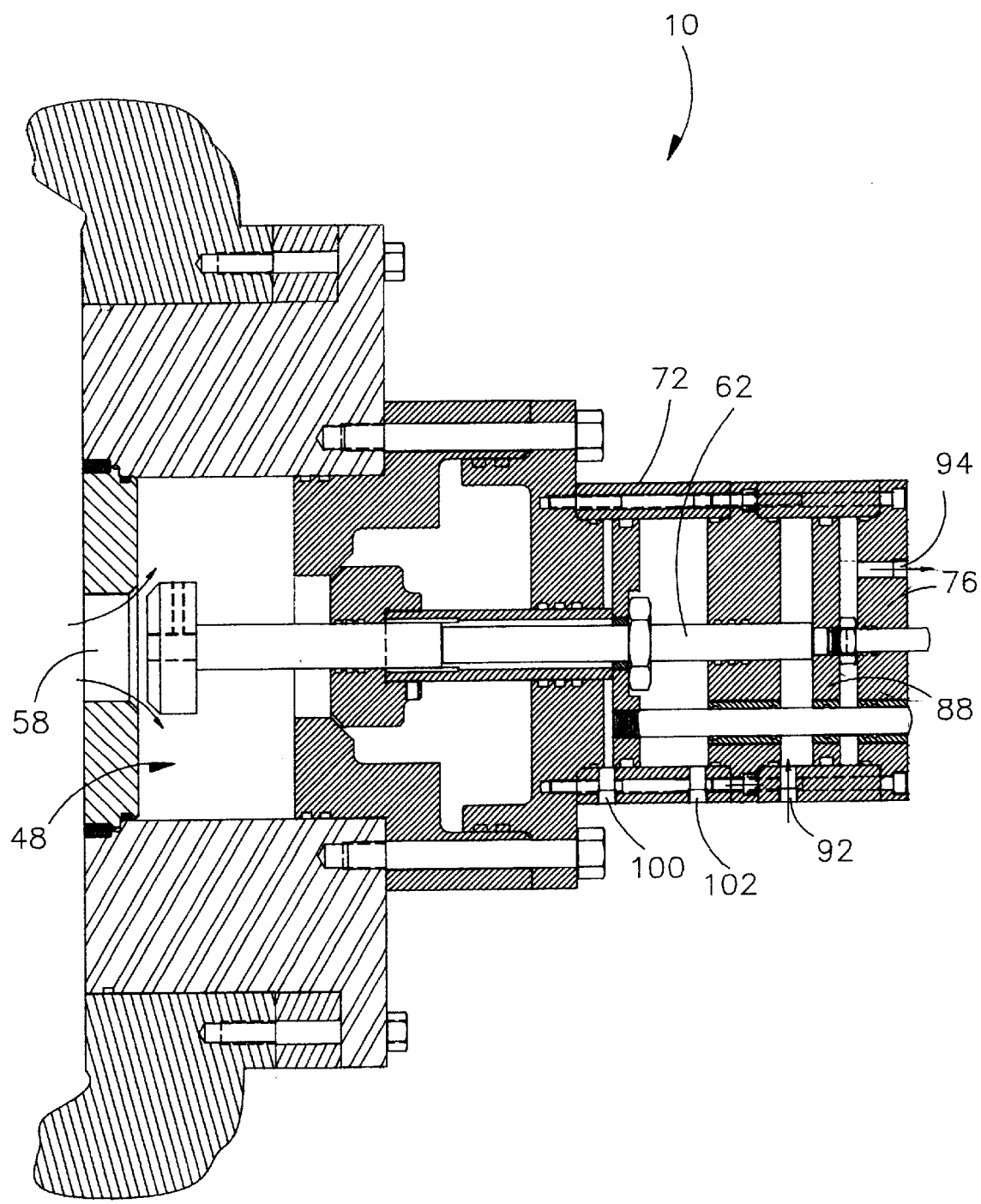
FIG. 5 is a sectional view similar to FIG. 4, but with the first stage of the unloader moved to the "open" position.
Figure 6:
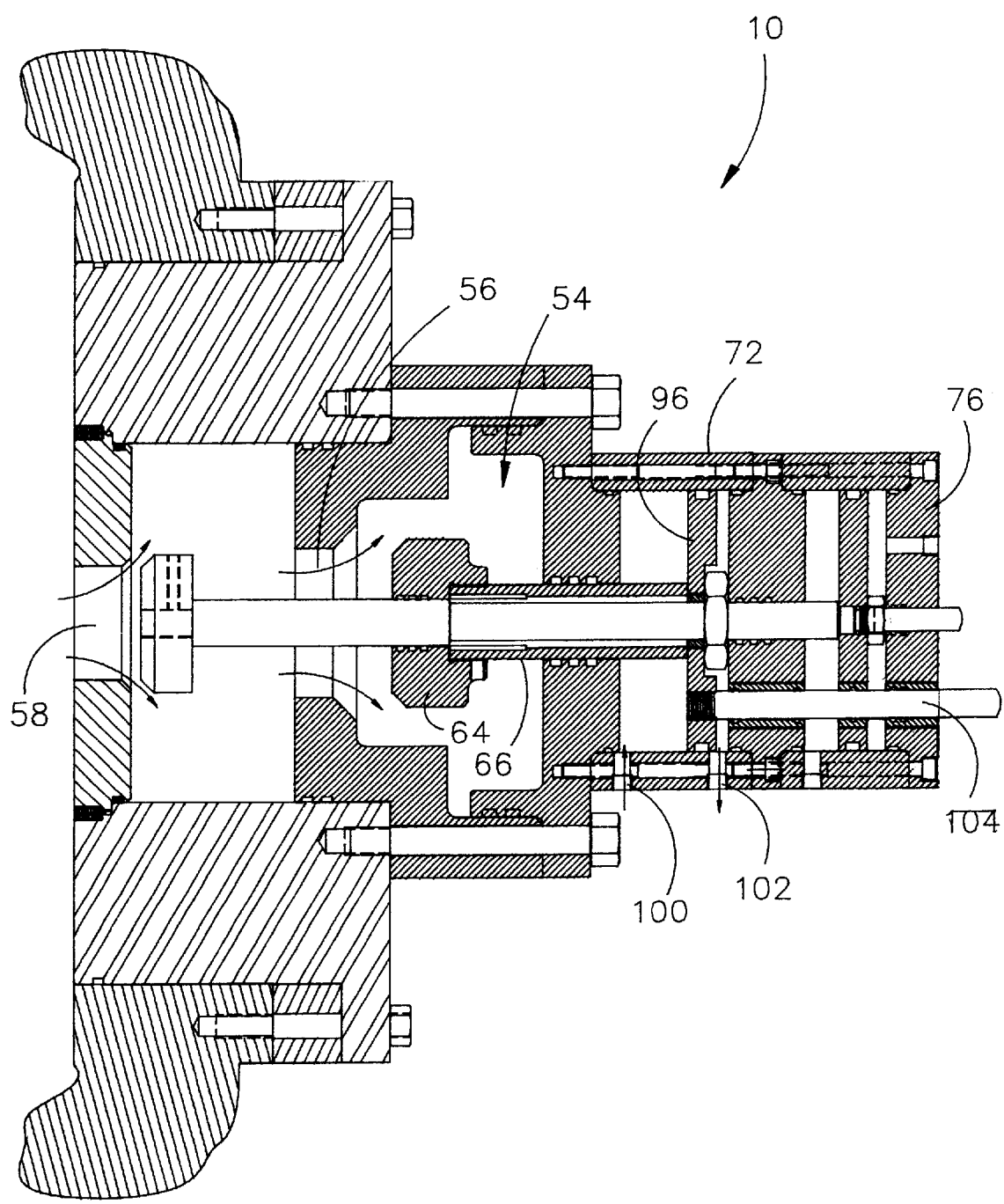
FIG. 6 is a sectional view similar to FIGS. 4 and 5, but with the second stage of the unloader moved to the "open" position.

In use, the two stage unloader 10 of the present invention may be mounted in the same location and restricted space as a single stage unloader, as shown in FIG. 2. As shown in FIGS. 4, 5, and 6, the two stage unloader 10 may be selectively operated to close both first and second stage ports 58 and 56 (shown in FIG. 4), open first stage port 58 (shown in FIG. 5), or open both first and second stage ports 58 and 56 (shown in FIG. 6).

A pneumatic operator (not shown) is connected to holes 92 and 94, and activated to force gas into hole 92 and out of hole 94, to thereby shift first stage piston 88 rearwardly. This in turn shifts the entire first stage actuator shaft 62 rearwardly such that the end projects out of top plate 76, as shown in FIG. 5. This movement of actuator shaft 62 also moves first stage plug 60 out of seated engagement with first stage port 58, to fluidly connect first stage cavity 48 with the bore 24 of the compressor cylinder 12 (shown in FIG. 2). Thus, the internal volume/clearance of the compressor cylinder is increased by the volume of first stage cavity 48. If operating conditions call for even greater clearance, a second pneumatic operator, connected to holes 100 and 102 in second stage cylinder 72 is activated. As shown in FIG. 6, this second operator will inject gas through hole 100 and out hole 102, to force second stage piston 96 rearwardly within second stage cylinder 72. This in turn will shift sleeve 66 rearwardly and the attached second stage plug 64 to thereby open second stage port 56 and increase the total clearance of the compressor cylinder by the volume of second stage cavity 54. Indicator pin 104 will project outwardly through top plate 76, to visually indicate that second stage port 56 is open.

Whereas the invention has been shown and described in connection with the preferred embodiment thereof, many modifications, substitutions and additions may be made which are within the intended broad scope of the appended claims.

We claim:

1. An unloader for a reciprocating compressor cylinder, comprising:

A first volume bottle having a hollow bore and forward and rearward closed ends forming a first cavity of predetermined volume;

a port formed in the first bottle forward end;

a first plug operably mounted within the first cavity for selectively opening and closing the first port;

a second volume bottle having a hollow bore and forward and rearward closed ends forming a second cavity of predetermined volume, the second bottle forward end forming a portion of the first bottle;

said first and second bottles being generally cylindrical and stacked in coaxial relationship;

a second port formed in the second bottle forward end, fluidly connecting the first and second cavities;

a second plug operably mounted in the second cavity for selectively opening and closing the second port;

a first actuator connected to the first port plug and selectively operable to move the first plug between a closed position sealing the first port and an open position opening the first port;

said first actuator including an elongated shaft extending from the first plug and thence out through the rearward end of the bottle;

a second actuator connected to the second plug and selectively operable to move the second plug between a closed position sealing the second port and an open position opening the second port;

said second actuator including an elongated sleeve extending from the second plug and out through the rearward end of the second bottle;

first means connected to the first actuator shaft outside of the first bottle, for operating the actuator to move the first plug, including:

a cylinder having forward and rearward ends and a piston mounted for slidable reciprocation within the cylinder between the ends;

the piston connected to the first actuator to move the actuator forwardly and rearwardly; and means for selectively moving the piston forwardly and rearwardly within the cylinder;

second means connected to the second actuator sleeve outside of the second bottle, for operating the actuator to move the second plug, including:

a second cylinder having forward and rearward ends and a second piston mounted for slidable reciprocation within the second cylinder between the ends;

a second piston connected to the second actuator to move the actuator forwardly and rearwardly; and second means for selectively moving the second piston forwardly and rearwardly within the second cylinder;

said first and second means for operating the actuators being operable independently of one another; and means exterior of the first and second bottles for visually indicating the open and closed positions of the plugs, including:

a first indicator pin connected at one end coaxial with the first actuator shaft and moveable therewith, the first pin having an outward end projecting exterior of the first and second bottles and the first and second cylinders, to visually display forward and rearward positions of the first plug; and a second indicator pin connected at one end to the second actuator piston and moveable therewith parallel to the first actuator shaft, the second pin having an outward end projecting exterior of the second bottle and first and second cylinders, to visually display forward and rearward positions of the second plug.

2. The unloader of claim 1, wherein the first and second actuators are oriented coaxially.

3. The unloader of claim 2, wherein the second plug includes an opening formed therethrough and wherein the first actuator shaft is journaled through the second plug opening and thence through the second actuator sleeve.

4. The unloader of claim 3, wherein the first and second cylinders are aligned coaxially.

5. The unloader of claim 4, wherein the second cylinder is mounted on the rearward end of the second bottle, and wherein the first cylinder is stacked on a rearward end of the second cylinder.

\* \* \* \* \*